US010208938B2

(12) United States Patent
Marinus et al.

(10) Patent No.: US 10,208,938 B2
(45) Date of Patent: Feb. 19, 2019

(54) LIGHTING DEVICE WITH IMPROVED THERMAL PROPERTIES

(71) Applicant: KONINKLIJKE PHILIPS N.V., Eindhoven (NL)

(72) Inventors: Antonius Adrianus Maria Marinus, Eindhoven (NL); Marcellus Jacobus Johannes Van der Lubbe, Best (NL); Vincent Stefan David Gielen, Eindhoven (NL); Hendrik Jan Eggink, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 176 days.

(21) Appl. No.: 14/767,736

(22) PCT Filed: Feb. 17, 2014

(86) PCT No.: PCT/IB2014/059032
§ 371 (c)(1),
(2) Date: Aug. 13, 2015

(87) PCT Pub. No.: WO2014/128605
PCT Pub. Date: Aug. 28, 2014

(65) Prior Publication Data

US 2015/0377469 A1 Dec. 31, 2015

Related U.S. Application Data

(60) Provisional application No. 61/766,265, filed on Feb. 19, 2013.

(51) Int. Cl.
*B60Q 1/06* (2006.01)
*F21V 29/00* (2015.01)
(Continued)

(52) U.S. Cl.
CPC ................ *F21V 29/50* (2015.01); *F21K 9/23* (2016.08); *F21K 9/238* (2016.08); *F21V 5/04* (2013.01);
(Continued)

(58) Field of Classification Search
CPC . F21K 9/238; F21K 9/23; F21K 9/233; F21V 29/504; F21V 29/004;
(Continued)

(56) References Cited

U.S. PATENT DOCUMENTS 7,976,182 B2 7/2011 Ribarich
2006/0193139 A1* 8/2006 Sun ......................... F21K 9/233
362/373

(Continued)

FOREIGN PATENT DOCUMENTS

CN 101706049 A 5/2010
EP 2306068 A1 4/2011

(Continued)

OTHER PUBLICATIONS http://www.tradezz.com/buy_8120787_JDR-glass-LED.htm.

(Continued)

*Primary Examiner* — Erin Kryukova
(74) *Attorney, Agent, or Firm* — Akarsh P. Belagodu

(57) ABSTRACT

The disclosed embodiments relate to a lighting device (1) comprising an exit window (2) and a light source substrate (3) arranged to carry at least one solid-state light source (4), the at least one light source (4) being arranged to emit light through the exit window (2). The exit window (2) is shaped to allow a front surface of the light source substrate (3) to be brought into physical contact with a surface of the exit window facing the light source substrate (3), and in that the light source substrate (3) is held in physical contact with the exit window (2), thereby enabling thermal contact between
(Continued)

the light source substrate (3) and the exit window (2). Since thermal contact between the exit window and the light source substrate is secured, the heat transfer of the lighting device will be improved.

8 Claims, 2 Drawing Sheets

(51) Int. Cl.

| | |
|---|---|
| ***F21V 3/00*** | (2015.01) |
| ***F21V 5/00*** | (2018.01) |
| ***F21V 7/00*** | (2006.01) |
| ***F21V 29/50*** | (2015.01) |
| ***F21V 5/04*** | (2006.01) |
| ***F21V 23/00*** | (2015.01) |
| ***F21V 29/504*** | (2015.01) |
| ***F21K 9/23*** | (2016.01) |
| ***F21K 9/238*** | (2016.01) |
| *F21Y 115/10* | (2016.01) |

(52) U.S. Cl.
CPC .......... *F21V 23/006* (2013.01); *F21V 29/504* (2015.01); *F21Y 2115/10* (2016.08)

(58) Field of Classification Search
CPC ...... F21V 23/006; F21V 29/50; F21V 29/503; F21V 5/04; F21V 5/00; F21V 7/0066; F21Y 2115/10
See application file for complete search history.

(56) References Cited

U.S. PATENT DOCUMENTS

| | | | | |
|---|---|---|---|---|
| 2006/0227558 | A1 | 10/2006 | Osawa et al. | |
| 2007/0133203 | A1* | 6/2007 | Chen | F21V 5/04 362/235 |
| 2009/0189169 | A1* | 7/2009 | Wei | F21V 29/004 257/98 |
| 2009/0237932 | A1* | 9/2009 | Lee | F21K 9/23 362/249.02 |
| 2010/0060132 | A1* | 3/2010 | Liu | F21V 29/02 313/46 |
| 2010/0109551 | A1 | 5/2010 | Shen | |
| 2010/0165630 | A1* | 7/2010 | Lin | F21K 9/233 362/294 |
| 2011/0074296 | A1* | 3/2011 | Shen | F21V 3/00 315/112 |
| 2011/0095690 | A1* | 4/2011 | Sagal | B29C 45/14 315/113 |
| 2011/0121704 | A1* | 5/2011 | Wang | F21V 31/005 313/46 |
| 2011/0133222 | A1 | 6/2011 | Allen et al. | |
| 2011/0156567 | A1* | 6/2011 | Wang | F21K 9/233 313/46 |
| 2011/0317412 | A1* | 12/2011 | Paik | F21S 48/328 362/235 |
| 2011/0317428 | A1* | 12/2011 | Paik | F21K 9/23 362/294 |
| 2012/0001531 | A1* | 1/2012 | Cho | F21V 3/04 313/46 |
| 2012/0074827 | A1* | 3/2012 | Hsieh | F21V 7/0083 313/46 |
| 2012/0112614 | A1 | 5/2012 | Pickard et al. | |
| 2012/0140437 | A1* | 6/2012 | Kim | F21K 9/00 362/84 |
| 2012/0182731 | A1 | 7/2012 | Kretschmann et al. | |
| 2012/0187836 | A1* | 7/2012 | Hashimoto | F21V 5/04 315/51 |
| 2012/0218773 | A1* | 8/2012 | Peiler | F21S 48/115 362/520 |
| 2012/0311849 | A1* | 12/2012 | Lee | F21V 19/004 29/592.1 |
| 2013/0100683 | A1* | 4/2013 | Tanaka | F21K 9/233 362/382 |
| 2013/0114251 | A1* | 5/2013 | Duan | F21V 29/004 362/235 |
| 2013/0134456 | A1* | 5/2013 | Lu | F21V 5/002 257/89 |
| 2013/0155695 | A1* | 6/2013 | Liu | F21V 29/006 362/373 |
| 2014/0063809 | A1* | 3/2014 | Huang | F21V 29/773 362/294 |

FOREIGN PATENT DOCUMENTS

| | | | |
|---|---|---|---|
| EP | 2489930 | A2 | 8/2012 |
| JP | 2011228265 | A | 11/2011 |
| JP | 2012018809 | A | 1/2012 |
| JP | 2013025935 | A | 2/2013 |
| JP | 2013026212 | A | 2/2013 |
| WO | 2010059748 | A1 | 5/2010 |
| WO | 2011012498 | A1 | 2/2011 |
| WO | 2012098594 | A1 | 7/2012 |

OTHER PUBLICATIONS http://www.ecwant.com/p_1440505_gu10-3528-60smd-glass.htm. GU10/E27/E14 12leds 5050 SMD Led Spotlight Glass Led Lamp Cup—LED bases | China Product . . . http://www.tradesparq.com/products/385118/GU10-E27-E14-12led-5050-SMD-Led-Spotlight-Glass-. . . .

* cited by examiner

LIGHTING DEVICE WITH IMPROVED THERMAL PROPERTIES

CROSS-REFERENCE TO PRIOR APPLICATIONS

This application is the U.S. National Phase application under 35 U.S.C. § 371 of International Application No. PCT/032014/059032, filed on Feb. 17, 2014, which claims the benefit of U.S. Provisional Patent Application No. 61/766,265, filed on Feb. 19, 2013. These applications are hereby incorporated by reference herein.

FIELD OF THE INVENTION

The present invention relates to the field of lighting devices, more particularly to a lighting device comprising an exit window and a light source substrate arranged to carry at least one solid-state light source.

BACKGROUND OF THE INVENTION

Modern lighting device, and in particular LED-based lighting devices, show long lifetimes, even up to 40,000 hours are claimed. Due to their long lifetime, these types of lamps constitute an extensive and worldwide market today.

One of the most widely used halogen lamps, the standard halogen MR 16 spots, are today to a large extent replaced by "retrofit" LED based lamps, often referred to as retrofit LED MR 16 lamps. Since there is a maximum tolerated temperature within the lamp, thermal constraints will limit the available light output. That is to say, the more heat generated within the lamp, the better heat spreading from the lamp will be required.

In many applications, the MR 16 spot is encapsulated by glass, and the only contact with the ambient is via the front exit window. Glass is often chosen in these types of LED lamps as it is a cheap and sustainable basic material. There are several advantageous properties of glass such as low cost, sustainability, suitable optical properties, and electrical insulation function. However, a drawback of glass is its thermal properties. The thermal conductivity of glass is about 1 W/(m·K). The thermal conductivity of glass encasing is better than plastics but worse than e.g. metal casing like aluminum. As a result, the heat dissipation from a glass encapsulated MR 16 lamp is relatively poor, and will negatively impact the performance of the LEDs.

An improved thermal performance can be realized by using active cooling, e.g. a fan. However, such a solution as well as other active cooling techniques available on the market today is rather complicated and expensive.

SUMMARY OF THE INVENTION

It is an object of the present invention to improve the technique above and other prior art by creating a lighting device with better thermal properties than current designs using passive cooling techniques.

According to a first aspect of the invention, this and other objects are achieved by a lighting device comprising an exit window and a light source substrate arranged to carry at least one solid-state light source. The at least one light source is arranged to emit light through the exit window. The lighting device is characterized in that the exit window is shaped to allow a front surface of the light source substrate to be brought into physical contact with a surface of the exit window facing the substrate, and in that the light source substrate is held in physical contact with the exit window, thereby enabling thermal contact between the light source substrate and the exit window.

Since thermal contact between the exit window and the light source substrate is secured, the heat transfer of the lighting device will be improved. This is due to the fact that the heat transfer from the light source towards and through the front exit window to the ambient is greatly facilitated.

The exit window may comprise at least one recess in the surface facing the light source substrate, which recess is arranged to receive said light source to allow physical contact between the exit window and the light source substrate. Such a configuration facilitates the possibility to provide and maintain a physical contact between these two elements.

The lighting device may further comprise a biasing element arranged to press the light source substrate into thermal contact with the exit window. The biasing element secures the physical contact between the exit window and the light source substrate and thereby the thermal contact between these two elements.

The lighting device may further comprise a funnel-shaped body arranged to surround the at least one light source and to reflect light emitted from the light source towards the exit window. By reflecting the light emitted from the light source towards the exit window, the heat transfer from the light source towards and through the front exit window to the ambient will be further increased. Additionally, the light emitted from the lighting device will be greatly enhanced by means of the funnel-shaped body focusing the light emitted from the light source in one general direction. The exit window and the funnel-shaped body may be formed as one integrated unit.

The funnel-shaped body may comprise an inner and an outer part, wherein a thermal filler is arranged between the inner and outer part. The thermal filler will improve the thermal conductivity of said inner and an outer part and thus the heat transfer from the light source towards and through the funnel-shaped body to the environment. Preferably, the thermal filler is a liquid, paste, solid or two-phased. One possible example is carbo filler which is a material with good thermal properties. Carbo filler has a thermal conductivity of about 200 W/(m·K).

The lighting device may further comprise a driver substrate arranged to carry a light source driver circuitry, wherein the biasing element is sandwiched between the light source substrate and the driver substrate, thereby pressing the driver substrate into thermal contact with the funnel-shaped body. Accordingly, the biasing element will also improve the heat transfer between the driver substrate and the funnel-shaped body. An efficient heat transfer from the light source towards and through the funnel-shaped body to the ambient will thus be provided.

The lighting device may further comprise a thermal glue arranged to thermally attach said light source substrate with the exit window, and/or to thermally attach driver substrate with the funnel-shaped body. The thermal glue will improve the heat transfer between the light source substrate and the exit window, and/or the heat transfer between the driver substrate and the funnel-shaped body and thus facilitate the heat transfer from the light source towards and through the front exit window and/or the funnel-shaped body to the ambient.

The biasing element may be constituted by a resilient member in a compressed state, so as to apply a force on the substrate(s). Thus, the resilient member may apply force to both the light source substrate and the driver substrate simultaneously. This is advantageous in that the thermal contact between the substrates and the exit window and the funnel-shaped body, respectively, is secured, and the number of part used in the lighting device is kept at a minimum.

The biasing element may be made of a material chosen from the group consisting of natural polyisoprene, synthetic polyisoprene, polybutadiene, chloroprene rubber, butyl rubber, halogenated butyl rubber, styrene-butadiene rubber, nitrile rubber, hydrogenated nitrile rubber, EPM rubber, EPDM rubber, epichlorohydrin, polyacrylic rubber, silicone rubber, fluorosilicone rubber, fluoroelastomer, chlorosulfonated polyethylene, ethylene-vinyl acetate, and glass wool. These are preferred embodiments of the present invention.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by "comprising" it is meant "comprising but not limited to" throughout the application. The expression biasing is intended to indicate that the element is adapted to bring the light source substrate into contact with the exit window.

It is noted that the invention relates to all possible combinations of features recited in the claims.

BRIEF DESCRIPTION OF THE DRAWINGS

This and other aspects of the present invention will now be described in more detail, with reference to the appended drawing showing an embodiment of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee.

Figure 1:
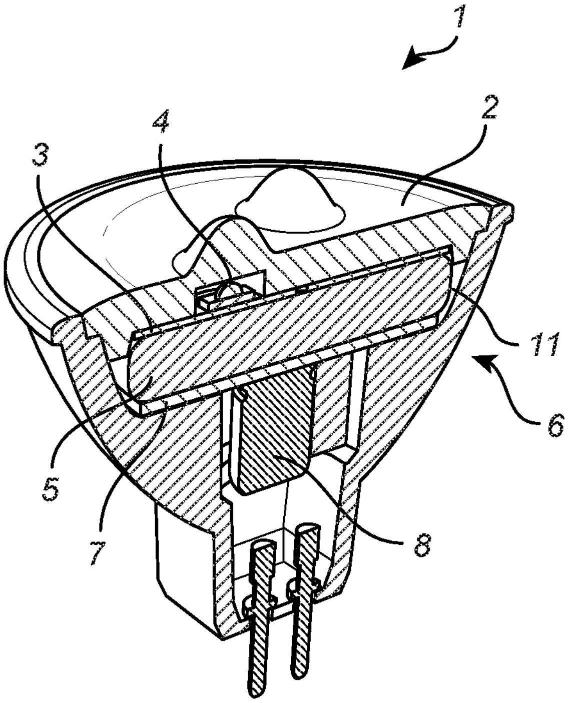
FIG. 1 is perspective view of the lighting device according a first exemplary embodiment of the present invention.

FIG. 1 illustrates a lighting device 1 according to a first exemplary embodiment of the present invention. The lighting device 1 comprises an exit window 2 and a light source substrate 3 arranged to carry at least one solid-state light source 4. The solid-state light source 4 is arranged to emit light through the exit window 2. The lighting device 1 has a biasing element 5 which is pressing the light source substrate 3 into thermal contact with the exit window 2, and a funnel-shaped body 6 surrounding the light source 4 and reflecting light emitted from the light source 4 towards the exit window 2. The exit window 2 has a recess 12 in the surface facing the light source substrate 3 which recess is shaped to receive the light source 4 when the light source substrate 3 and the exit window 2 bear against each other. This makes it possible for the substrate 3 and the exit window 2 to make contact across a larger area, i.e. most of the area surrounding the light sources 3. If the lighting device 1 is equipped with a plurality of light sources 4, it may be equipped with a recess 12 for every light source 4. It could naturally also be possible to provide a recess 12 which can receive a plurality of light sources 4. Some of the light emitted by the light source 4 is reflected towards the exit window 2 by means of a reflective surface 11 provided on the inside surface of the funnel-shaped body 6. By pressing the light source substrate 3 into thermal contact with the exit window 2, the biasing element 5 will improve the heat transfer between the light source substrate 3 and the exit window 2 and thus facilitate the heat transfer from the light source 4 towards and through the front exit window 2 to the ambient.

Extensive thermal simulations have been made in order to test the temperature changes obtained in the lighting source due to the new construction of the same. The thermal simulations indicate that with the conductive element having thermal conductivity between 100-500 W/(m·K) and being arranged according to the above, the temperature of the light source will be decreased with about 50%.

In this exemplary embodiment, the lighting device 1 further comprises a driver substrate 7 which carries a light source driver circuitry 8. The biasing element 5 is sandwiched between the light source substrate 3 and the driver substrate 7, thereby pressing the light source substrate 3 into thermal contact with the exit window 2, as described above, and simultaneously pressing the driver substrate 7 into thermal contact with the funnel-shaped body 6. That is to say, when mounted in the lighting device 1, the biasing element 5 is in a compressed state, so as to apply a force on the two substrates 3, 7. The thermal contact between the driver substrate 7 and the funnel-shaped body 6 is thereby also secured and an efficient heat transfer from the light source towards and through the funnel-shaped body 6 to the ambient will thus be provided. The light source substrate 3 is constituted by a printed circuit board on which the light source 4 or light sources 4 are attached, and the driver substrate 7 is constituted by a printed circuit board on which the light source driver circuitry 8 (electronics) are attached. In this first exemplary embodiment of the invention, the funnel-shaped body 6 has at least two shoulders provided on its inner surface against which the driver substrate 7 will abut when mounted in the lighting device 1. The funnel-shaped body 6 is preferably made of glass. Glass is a preferred material because it is a cheap and sustainable basic material. The good properties of glass are low cost, sustainable, good optical properties, nice aesthetics, and electrical insulation function.

Figure 2:
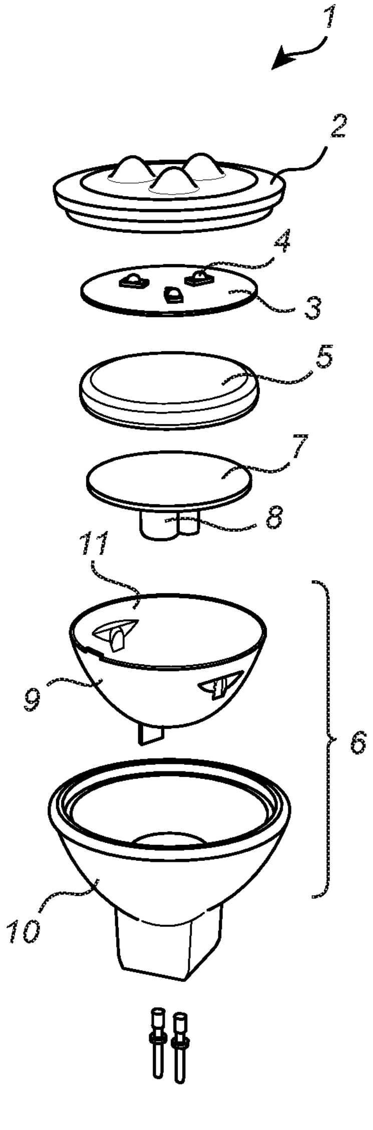
FIG. 2 is an exploded perspective view of the lighting device according a second exemplary embodiment of the present invention.

Reference is now made to FIG. 2 illustrating the lighting device 1 according a second exemplary embodiment of the present invention. In this embodiment, the funnel-shaped body 6 has an inner and an outer glass part 9, 10. The glass parts 9, 10 of the funnel-shaped body 6 are preferably 0.5 mm thick and the distance between them which is preferably 1 mm. As stated above, a drawback of glass is its thermal conductivity which is about 1 W/(m·K). However, that problem could be solved by using a thermal filler provided between the glass parts 9, 10 of the funnel-shaped body 6. This way, the thermal conductivity of the glass will be significantly improved. The result is achieved due to an improved heat transfer from the light source 2 towards and through the parts 9, 10 of the funnel-shaped body 6 to the ambient. In this embodiment of the invention, the reflective surface 11 is provided on the inner surface of the inner part 9 of the funnel-shaped body 6. Further, the inner part 9 has at least two shoulders provided on its inner surface against which the driver substrate 7 will abut when mounted in the lighting device 1 according to the second exemplary embodiment.

Figure 3:
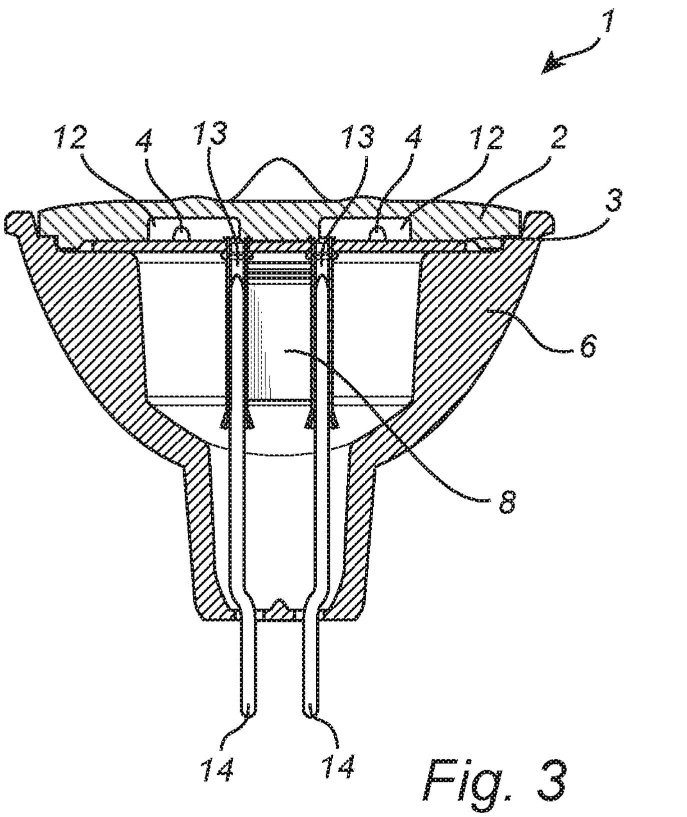
FIG. 3 is a side view of the lighting device according to a third exemplary embodiment of the present invention.

FIG. 3 illustrates a lighting device 1 according to a third exemplary embodiment of the present invention. In this embodiment, the lighting device 1 comprises a light source substrate 3 which is clamped between the exit window 2 and the funnel-shaped body 6. Thermal glue can also be used in order to additionally secure the light source substrate 3 between the exit window 2 and the funnel-shaped body 6. The light sources 4 are attached to the surface of the light source substrate 3 facing the exit window 2, and the light source driver circuitry 8 is attached to the opposite surface of the light source substrate 3. The recesses 12 of the exit window 2 are adapted to receive the light sources 4. The lighting device 1 further comprises two electrically conductive sleeves 13 which are attached to the light source substrate 3. In turn, a pin 14 is introduced in each one of the sleeves 13. The pins 14 extend outside of the funnel-shaped body 6 and will provide the light source substrate 3 with power via the sleeves 13 when the lighting device 1 is in use.

Figure 4:
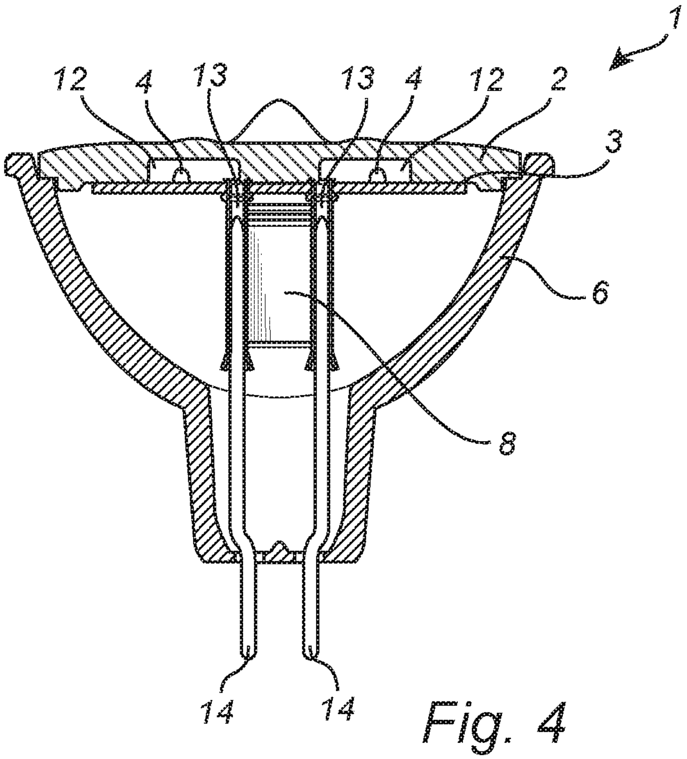
FIG. 4 is a side view of the lighting device according to a fourth exemplary embodiment of the present invention.

Reference is now made to FIG. 4 illustrating the lighting device 1 according a fourth exemplary embodiment of the present invention. In this embodiment, the lighting device 1 comprises a light source substrate 3 which is attached to the exit window 2 by means of thermal glue. The light sources 4 are attached to the surface of the light source substrate 3 facing the exit window 2, and the light source driver circuitry 8 is attached to the opposite surface of the light source substrate 3. The recesses 12 of the exit window 2 are adapted to receive the light sources 4. The lighting device 1 further comprises two electrically conductive sleeves 13 which are attached to the light source substrate 3. In turn, a pin 14 is introduced in each one of the sleeves 13. The pins 14 extend outside of the funnel-shaped body 6 and will provide the light source substrate 3 with power via the sleeves 13 when the lighting device 1 is in use.

The following is a simplified description of one possible way to mount the main elements of the lighting device 1, as illustrated in FIGS. 1 and 2, together. The funnel-shaped body 6 is provided as a first element and constitutes the bottom section of the lighting device 1. Two electrically conductive connectors, e.g. pins as illustrated in FIG. 4, for supplying electricity to the lighting device 1 are attached to the bottom part of the funnel-shaped body 6. Thereafter, the driver substrate 7 is placed within the funnel-shaped body 6 in contact with the connectors, e.g. by means of sleeves as illustrated in FIG. 4. The biasing element 5 is placed on top of the driver substrate 7, and on top of the biasing element 5, the light source substrate 3 is provided. Finally, the exit window 2 is attached to the funnel-shaped body 6 as a top section of the lighting device 1. When the exit window 2 is attached to the funnel-shaped body 6, it will press down on the parts placed within the funnel-shaped body 6, thus placing the biasing element 5 in a compressed state. The result of the biasing element 5 being in a compressed state is that the light source substrate 3 is being pressed into thermal contact with the exit window 2 simultaneously as the driver substrate 7 is being pressed into thermal contact with the funnel-shaped body 6. Thereby, the heat transfer between the main elements of the lighting device 1 is secured and the temperature of the same can be kept to a minimum. The exit window 2 can be attached to the funnel-shaped body 6 by, for example, a thermal glue. Another possibility is to provide the exit window 2 with an outer threading and the funnel-shaped body 6 with an inner threading and thereafter attach the exit window 2 to the funnel-shaped body 6 by screwing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

For instance, the biasing element can be made of a number of different materials. In one embodiment of the present invention, the biasing element is constituted by a thermal glue arranged to thermally attach the light source substrate with the exit window, and to thermally attach driver substrate with the funnel-shaped body. In another embodiment of the present invention, the exit window and the funnel-shaped body are integrally formed.

In one example, the biasing element is a resilient member which is in a compressed state, so as to apply a force on the substrate(s).

The invention claimed is:

1. A lighting device, comprising:

an exit window;

a light source substrate arranged to carry at least one solid-state light source, said at least one light source being arranged to emit light through said exit window, the light source substrate having an edge; and a body arranged to surround said at least one light source and said light source substrate, the body comprising a reflective surface provided on an inside surface of the body to reflect light emitted from said at least one light source towards said exit window, the reflective surface arranged around the edge of the light source substrate and below the at least one solid-state light source;

wherein said exit window is shaped to allow a front surface of said light source substrate to be brought into physical contact with a surface of said exit window facing said light source substrate, and in that said light source substrate is held in physical contact with said exit window, thereby enabling thermal contact between the light source substrate and said exit window, thereby facilitating the heat transfer from the at least one solid state light source towards and through the exit window;

said lighting device further comprising a driver substrate arranged to carry a light source driver circuitry and a biasing element being sandwiched between said light source substrate and said driver substrate, thereby pressing said light source substrate into thermal contact with the exit window and said driver substrate into thermal contact with said body.

2. The lighting device according to claim 1, wherein said exit window comprises at least one recess in said surface facing the light source substrate, which recess is arranged to receive said at least one light source to allow physical contact between said exit window and said light source substrate.

3. The lighting device according to claim 1, wherein the body is funnel-shaped.

4. The lighting device according to claim 3, wherein said exit window and said funnel-shaped body are formed as one integrated unit.

5. The lighting device according to claim 3, wherein said funnel-shaped body comprises an inner and an outer part, and heat generated by said at least one light source is transferred through said inner and outer parts of said funnel-shaped body.

6. The lighting device according to claim 1, wherein the biasing element constitutes a resilient member in a compressed state, so as to apply a force on the light source substrate and the driver substrate.

7. The lighting device according to claim 1, wherein the biasing element is made of a material chosen from the group consisting of natural polyisoprene, synthetic polyisoprene, polybutadiene, chloroprene rubber, butyl rubber, halogenated butyl rubber, styrene-butadiene rubber, nitrile rubber, hydrogenated nitrile rubber, EPM rubber, EPDM rubber, epichlorohydrin, polyacrylic rubber, silicone rubber, fluorosilicone rubber, fluoroelastomer, chlorosulfonated polyethylene, ethylene-vinyl acetate, and glass wool.

8. A lighting device, comprising:

an exit window;

a light source substrate arranged to carry at least one solid-state light source, said at least one light source being arranged to emit light through said exit window, the light source substrate having an edge; and a body arranged to surround said at least one light source and said light source substrate, the body comprising a reflective surface provided on an inside surface of the body to reflect light emitted from said at least one light source towards said exit window, the reflective surface arranged around the edge of the light source substrate and below the at least one solid-state light source;

wherein said exit window is shaped to allow a front surface of said light source substrate to be brought into physical contact with a surface of said exit window facing said light source substrate, and in that said light source substrate is held in physical contact with said exit window, thereby enabling thermal contact between the light source substrate and said exit window, thereby facilitating the heat transfer from the at least one solid state light source towards and through the exit window;

said lighting device further comprising a driver substrate arranged to carry a light source driver circuitry, wherein said reflective surface extends alongside said driver substrate, said lighting device further comprising a biasing element sandwiched between said light source substrate and said driver substrate.

* * * * *